(No Model.) 3 Sheets—Sheet 1.

S. M. JENKS.
HAY RAKE AND LOADER.

No. 590,103. Patented Sept. 14, 1897.

WITNESSES:

INVENTOR
S. M. Jenks.
BY
ATTORNEYS.

(No Model.) 3 Sheets—Sheet 2.

S. M. JENKS.
HAY RAKE AND LOADER.

No. 590,103. Patented Sept. 14, 1897.

WITNESSES:

INVENTOR
S. M. Jenks.
BY
ATTORNEYS.

(No Model.) 3 Sheets—Sheet 3.
S. M. JENKS.
HAY RAKE AND LOADER.
No. 590,103. Patented Sept. 14, 1897.
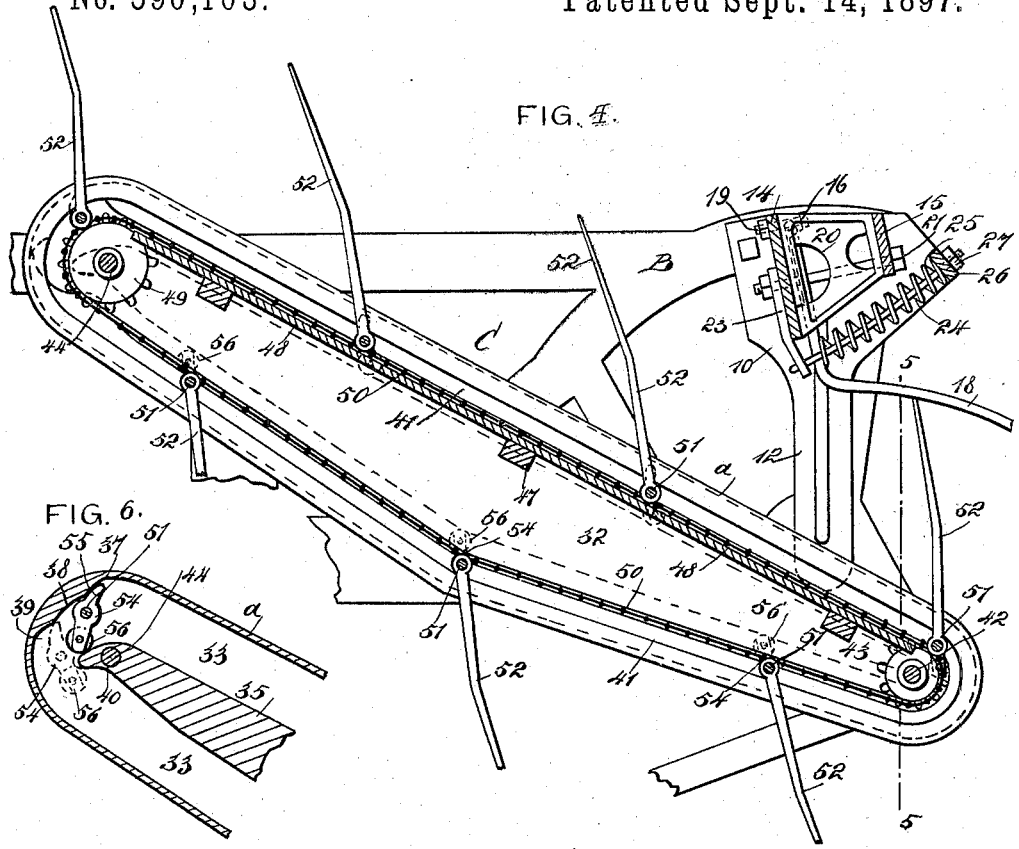
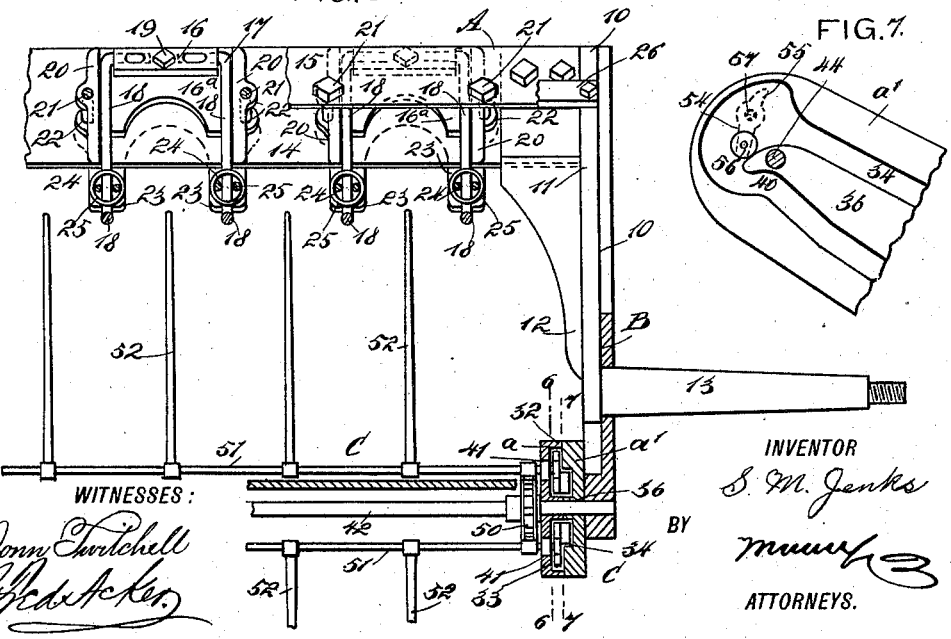
WITNESSES:
Donn Twitchell
Fred Acker
INVENTOR
S. M. Jenks
BY
ATTORNEYS.

UNITED STATES PATENT OFFICE.

SAMUEL M. JENKS, OF MADISON, SOUTH DAKOTA.

HAY RAKE AND LOADER.

SPECIFICATION forming part of Letters Patent No. 590,103, dated September 14, 1897.

Application filed February 26, 1897. Serial No. 625,204. (No model.)

*To all whom it may concern:*

Be it known that I, SAMUEL M. JENKS, of Madison, in the county of Lake and State of South Dakota, have invented a new and Improved Hay Rake and Loader, of which the following is a full, clear, and exact description.

The object of the invention is to provide a hay rake and loader so constructed that the hay will be picked up cleanly and thoroughly from the ground and automatically delivered to a platform traveling in direction of the front and rear of the machine, the said platform being provided with pickers which support the hay as it is carried upward and forward and drop automatically out of the way the moment the hay is discharged. The hay from the inclined platform is received upon a horizontal conveyer or table arranged to travel transversely in the frame of the machine.

Another object of the invention is to provide an elevator in connection with the horizontal table or platform, which elevator will be of such construction that it may be adjusted to any angle with respect to the horizontal conveyer or table for the purpose of delivering the hay at the desired elevation or to a predetermined receptacle located at the side of the machine.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
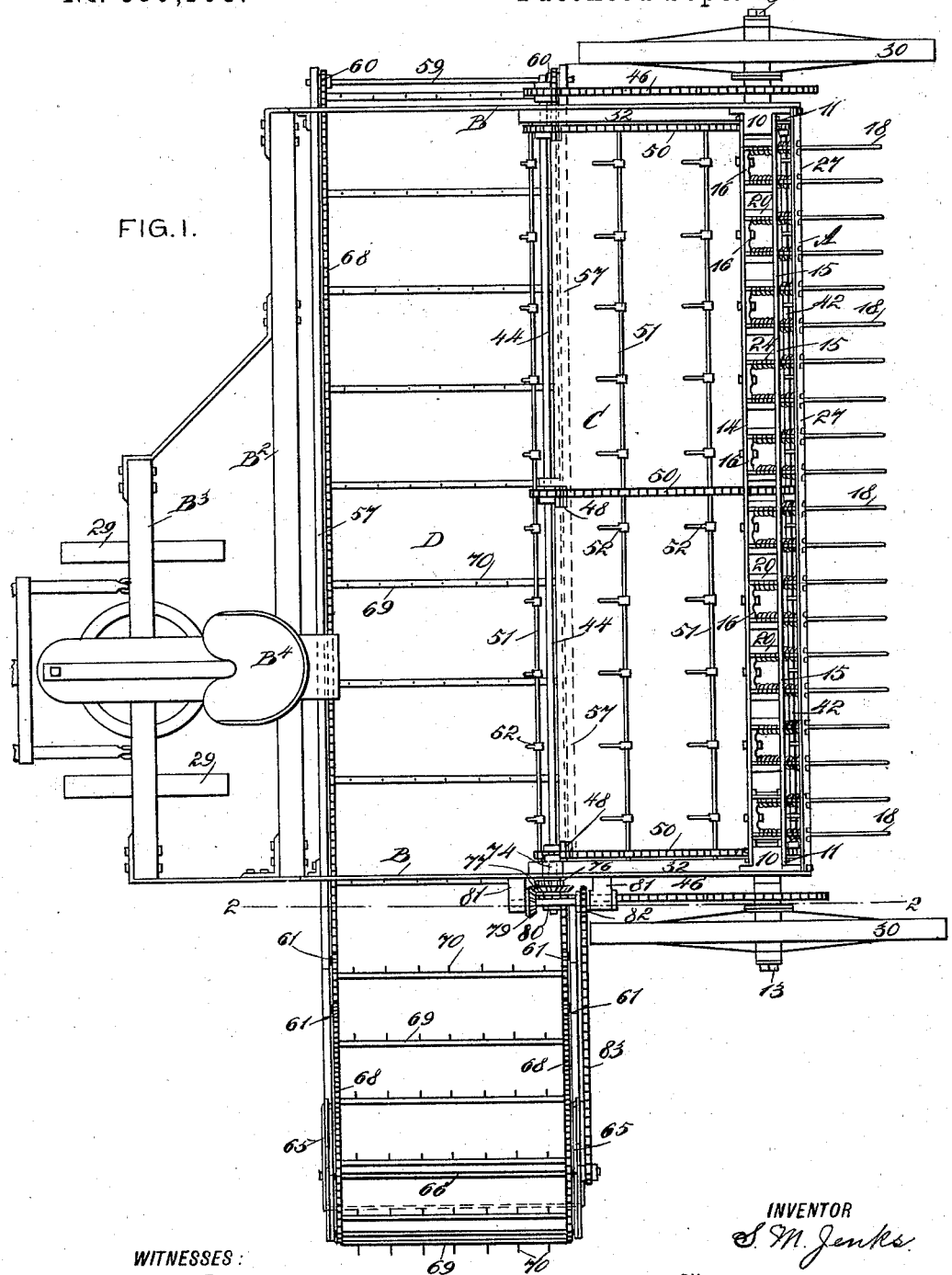
Figure 2:
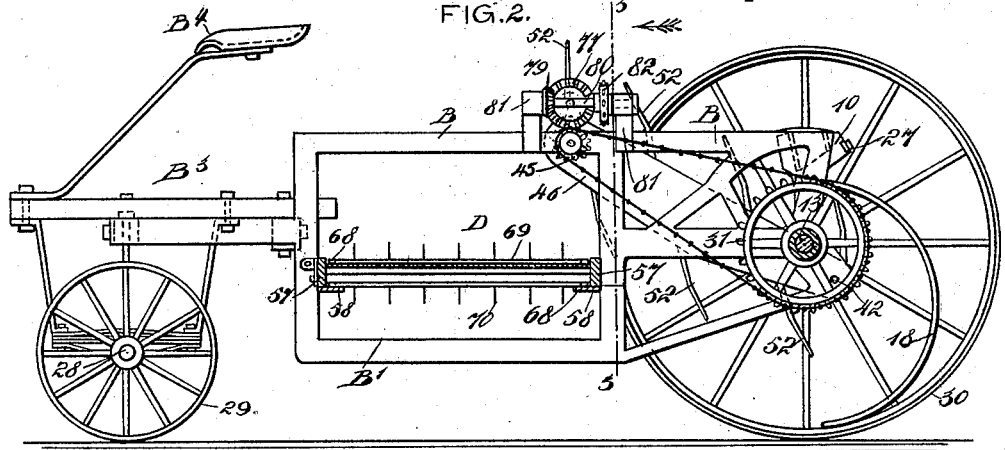
Figures 3, 8, 9:
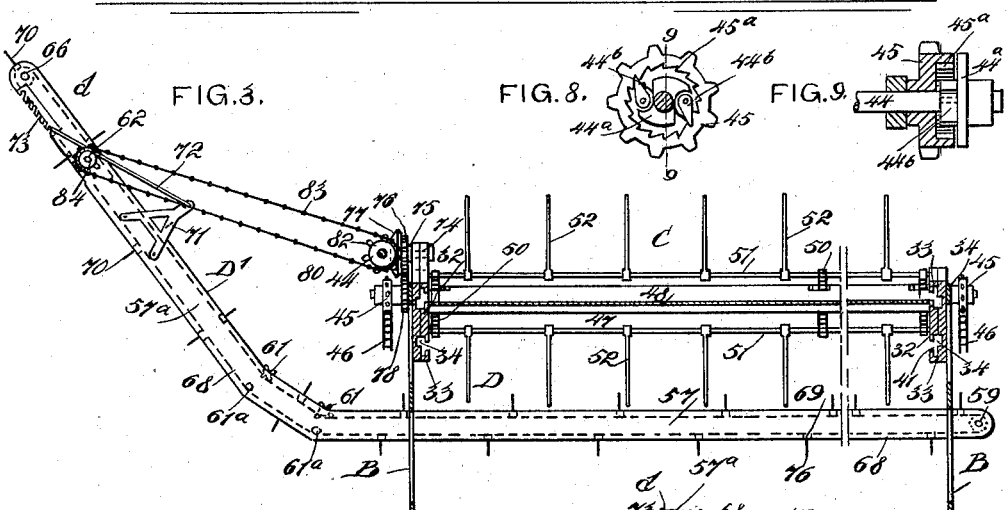
Figures 10, 11:
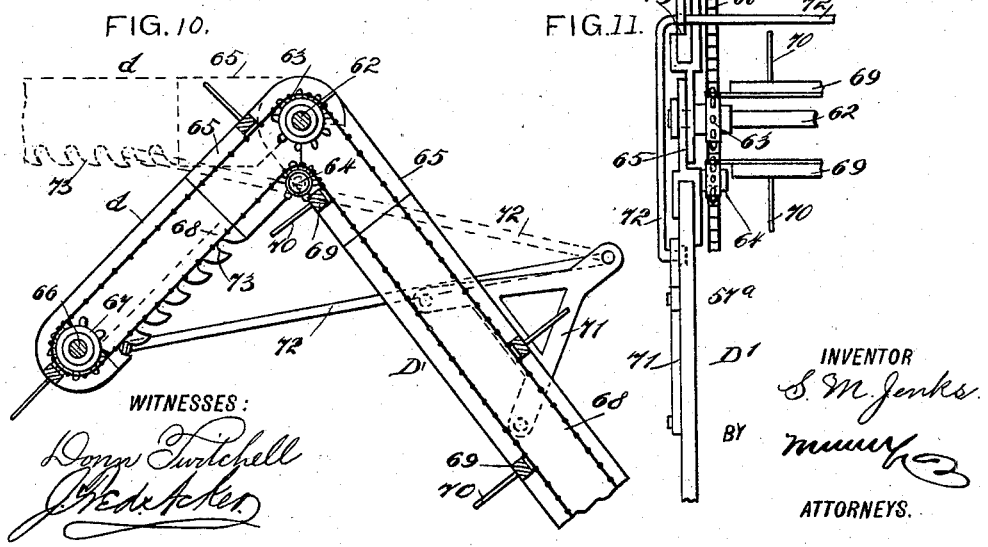

Figure 1 is a plan view of the machine in its entirety. Fig. 2 is a horizontal section taken substantially on the line 2 2 of Fig. 1. Fig. 3 is a cross-section taken substantially on the line 3 3 of Fig. 2. Fig. 4 is a longitudinal section through the inclined platform or conveyer which receives the hay from the rakes, the section being made on an enlarged scale. Said section is also taken through the rake-head, illustrating the manner in which the head is constructed and the teeth applied. Fig. 5 is a cross-section through the inclined platform or conveyer, taken practically on the line 5 5 of Fig. 4, said Fig. 5 also illustrating the rake-head partially in rear elevation, a portion of the rear plate of the head being broken away. Fig. 6 is a longitudinal section of the upper portion of a head or guide bar for the inclined platform or conveyer, the section being taken practically on the line 6 6 of Fig. 5. Fig. 7 is a section taken on the line 7 7 of Fig. 5, showing one portion of the head shown in Fig. 6 in side view. Fig. 8 is a transverse section through the drive-shaft for the inclined conveyer or platform and illustrates in side elevation the clutch-driving pinion connected with the shaft. Fig. 9 is a section taken substantially on the line 9 9 of Fig. 8. Fig. 10 is a section through the upper portion of the elevator, illustrating the manner in which the upper section of the elevator is adjusted; and Fig. 11 is a bottom plan view of one side of that portion of the elevator shown in Fig. 10.

The rake-head A is an important feature of the invention and can be used in connection with a horse hay-rake or a like machine as readily as in connection with a machine of the type shown in the drawings.

The frame of the rake-head consists principally of end plates 10 and side bars 14 and 15. Each end plate is provided with a pendent section 12, to which the axles 13 are secured, as shown in Figs. 1 and 5. The plate 14, which is the front plate of the frame, is secured to the front recessed portions of the end blocks or plates and is wider than the rear plate 15. At intervals in the length of the front plate 14 of the head horizontal socket-plates 16 are secured upon the inner face of said front plate, as is particularly shown in Figs. 1 and 5. Each socket-plate 16 is provided with an extension 16$^a$, projected downwardly therefrom, which serves to strengthen the front plate of the frame.

The upper ends 17 of the rake-teeth 18 are received in each socket-plate 16, the rake-teeth being curved rearwardly and downwardly in a manner to engage with the ground at their lower extremities, and the socket-plates 16 are preferably secured to the front plate by passing a bolt 19 through the center of said socket-plate, between the ends of the rake-teeth and through the front plate of the frame. The upper portions of the rake-teeth, or those portions carried transversely of the front plate of the frame, have bearing against the end portions of the extensions 16ᵃ of the socket-plates 16, as is clearly shown in Fig. 5, and the rake-teeth are further held in firm position within the head by means of bridge-castings 20, which engage with the outer vertical faces of the rake-teeth and are carried from the front plate 14 to the rear plate 15 of the head, as shown in Fig. 4. Bolts 21 are employed for securing the bridge-castings in position in the frame of the head, said bolts being passed through openings made in lugs 22, formed upon the bridge-castings, and said bolts likewise pass through the rear and front plates of the frame, as is also shown in Fig. 4.

Hangers 23, preferably of horseshoe shape, are secured upon the front face of the front bar or plate 14 of the rake-head, these hangers being located immediately in front of the socket-plates 16. The members of the hanger are made to project downward below the lower end of the front portion of the head, as shown in Figs. 4 and 5. A clevis or U-shaped guide-rod 24 is supported at its bow end by the lower projecting portion of each hanger. These guide-rods 24 are carried rearward and are given an upward curve, as shown particularly in Fig. 4, and their rear ends are passed through apertures in a cross-bar 26, secured to the rear upper portions of the end blocks or plates of the rake-head frame. A spring 25 is coiled around each guide or clevis bar, the springs having bearing against the cross-bar 26 and likewise against the rake-teeth at or near the point where the teeth are downwardly and rearwardly curved. Suitable lock-nuts 27 are secured upon the rear projecting ends of the clevis or guide bars.

It will be observed that under this construction a perfect trussed head will be obtained, since each bridge-casting 20 constitutes a truss for the frame of the rake-head.

It is evident that by constructing the rake-head in the manner above described said head may be made of any desired length and that it may be applied to any structure where rake-teeth are to be held in a head.

The main frame of the machine consists of two side pieces B, which are attached at their rear ends to the end portions of the rake-head A. The side pieces of the frame are preferably made as open as possible in the interest of lightness, but at the forward portion of each side frame a large rectangular opening B' is made. The side portions B of the main frame are connected at the front by a beam B², the latter being connected in its turn with a second and shorter frame B³, constituting a forward extension of the main frame, and this forward extension carries the seat B⁴ and is supported by a pivoted axle 28, having wheels 29 of proper size mounted thereon. The rear wheels 30 of the machine are mounted on the axles 13, connected with the rake-head and are of greater diameter than the forward wheels 29. The pivotal connection of the axle with the front portion of the frame enables the machine to be turned in a small compass. A sprocket-wheel 31 is securely attached to the inner face of each of the rear wheels 30, the sprocket-wheels 31 constituting drivers for mechanism to be hereinafter described.

A conveyer C is employed to take the hay from the rake-teeth 18. This conveyer has a traveling platform and is given an inclination upwardly and forwardly from the rear of the machine, the frame of the conveyer being attached at its lower or rear end to the lower rear portion of the sides B of the frame, while the upper portion of the conveyer-frame usually extends slightly beyond the upper edge of the sides B of the main frame. The frame of the conveyer C, as shown, consists of two boxes or side heads 32, which are secured to the sides B of the frame, as before mentioned. Each box is preferably made in two longitudinal sections $a$ and $a'$. A continuous channel 33 is formed upon the inner face of the inner section $a$, while a corresponding channel 34 is made in the opposing or inner face of the outer section $a'$, as is clearly shown in Fig. 5. The channel 33 is wider than the channel 34. The channel 33 extends around a lug 35, formed longitudinally on the section $a$ of the box, and the channel 34 of the opposing box-sections extends around a like lug 36. When the box-sections are brought together, these two lugs come in contact and operate jointly, as illustrated in Fig. 5, to form a track. The upper stretches of both channels 33 and 34 are straight, while the lower stretches of the said channels are of angular form, tapering upward in direction of the ends of the box from a point near the center.

At the ends of the box-sections the channels 33 and 34 are of substantially cylindrical formation, and in the end wall of the channel 33, at the upper portion of the box, cavities are made, preferably of somewhat segmental shape, and the cavities are usually three in number (designated, respectively, as 37, 38, and 39) and are in a measure graduated as to depth, as illustrated in Fig. 6. The upper end portion of the track formed by the lugs 35 and 36 is contracted and curved downwardly and forwardly so abruptly as to form quite a deep recess 40 in the under face of the track near its upper extremity, as is shown in both Figs. 6 and 7. A continuous slot 41 is made in the outer face of the inner section $a$ of each box 32, communicating with and following the contour of the channel 33 in the inner face of that section. A shaft 42 is journaled in the lower portion of the boxes and likewise in the sides of the main frame. The shaft 42 is preferably made to carry two or more sprocket-wheels 43, preferably three, arranged one at each end and one near the center. A second shaft 44 is journaled in the upper end portions of the boxes and likewise in suitable bearings on the side portions of the frame. The upper shaft 44 extends beyond the side pieces of the main frame, as shown in Fig. 3, and at each outer extremity is provided with a ratchet-gear consisting of a sprocket-wheel 45, loosely mounted on the shaft and provided with internally-placed ratchet-teeth 45ª, and a mutilated disk 44ª, which is secured on the shaft and is provided with dogs 44ᵇ, engaging with the ratchet-teeth of the sprocket-wheel 45. The construction of the ratchet-gears is fully shown in Figs. 8 and 9.

The sprocket-wheels 45 are connected by chain belts 46 with the driving-gears 31 of the rear wheels. The object of the ratchet-gears is to permit of the machine turning or backing without operating the parts controlled by the rotation of the upper or driving shaft 44 of the conveyer. The boxes or side heads of the conveyer C are connected by sills 47, upon which the flooring 48 is laid, extending from the lower ratchet-wheels 43 to the ratchet-wheels 49, having a like location on the drive-shaft 44 as the lower wheels on the lower shaft 42. This flooring is usually nearly parallel with the lower portion of the upper stretches of the outer slots 41 in the boxes.

Chain belts 50 are passed over the lower and upper sprocket-wheels 43 and 44, forming the movable portion of the conveyer, and crossbars 51 are attached to these chain belts and connect them. The cross-bars 51 extend through the outer slots 41 in the boxes or side heads for the conveyer into the internal grooves therein. Pickers 52 are secured at intervals on each of the connecting cross-bars 51, and the said cross-bars are so mounted on the chain belts that they may turn therein. The pickers 52 are preferably made as shown, each comprising a single member having the form of a finger, and each finger or picker is bent at a point between its ends, usually at the center, the bending of the pickers or picker-fingers being such that when the pickers are above the flooring 48 they will incline forwardly, and when below the flooring the picker-fingers will incline rearwardly.

The picker-fingers are so grouped that they will pass between the rake-teeth as they approach the rear ends of the boxes and will take the hay gathered by the rake-teeth and carry it up over the inclined flooring 48 and deliver it at the upper end of the conveyer. When the picker-fingers reach the lower depressed portions of the boxes, or the lower central point near the bottom thereof, the fingers will be substantially in engagement with the ground and in condition to gather any hay that may be scattered in front of the rake-teeth, in addition to taking up the hay cleanly and effectively from the rake-teeth, causing the hay to follow the upper inclined plane of these teeth in its passage to the top part of the conveyer.

The picker-fingers, as heretofore stated, when above the platform or flooring 48, face forwardly and lean slightly in that direction; but the position of the fingers must be reversed or changed to enable them to pass readily below the platform or flooring. This is accomplished usually through the medium of tripping arms or levers 54. (Shown particularly in Figs. 5, 6, and 7.) The tripping arms or levers are attached to the end portions of the finger-carrying rods or cross-bars 51. The levers travel in the continuous channels 33 in the inner faces of the inner sections a of the boxes. Each lever is provided with a head 55, slightly curved, and at its opposite end each lever is provided with a friction-roller 56, which travels on the track formed by the lugs 35 and 36; but the friction-rollers 56 will travel also in the channels 34 in the inner faces of the outer sections a' of the boxes, as shown in Fig. 5.

While the fingers 52 are above the platform or flooring 48 the friction-rollers 56, connected with them, will travel on the upper faces of the tracks in the boxes, and the heads of the levers 54 will have an upward inclination. When a finger, however, reaches the upper end of the conveyer and just as it has discharged its load, the head of the lever connected with the rod carrying such fingers will engage with the segmental recesses 37, 38, and 39 at the upper ends of the grooves or channels in which said levers travel, the friction-rollers 56 of the levers meanwhile traveling down the inclined upper end of the track, as shown in Fig. 6. As the friction-rollers reach the lower portion of the upper end of the track, as shown in dotted lines in Fig. 6, the heads of the levers will have reached the deepest recesses 39. The friction-rollers will then enter the recesses 40 in the bottom part of the track, and, as shown in Fig. 4, the weight of the fingers will reverse the position of the levers, bring the fulcrums of the levers in advance of the pivot of the rollers. Thus the fingers may drop at the time when there will be no material at the upper end of the conveyer to interfere with them and be carried in a direction to again take up the hay from the rake-teeth.

A horizontal conveyer D is located in the forward portion of the main frame, extending from side to side at the opening B' in said main frame. The horizontal conveyer D is placed a predetermined distance below the delivery end of the inclined conveyer C and receives the material from the latter. The frame of the horizontal conveyer consists of side pieces 57, which are bolted or otherwise secured to the said sections B of the main frame, as shown in Figs. 1 and 2, each side piece 57 being provided with a bearing-strip 58, which extends horizontally beyond the inner faces of the said side beams or pieces, as is also shown in Fig. 2; but the side pieces or beams 57 of the conveyer-frame may be made angular in cross-section, if desired.

The side pieces of the frame of the horizontal conveyer D extend beyond the right-hand side of the main frame but a slight distance, and in these projecting ends of the frame a shaft 59 is journaled, provided with sprocket-wheels 60. At the left-hand side of the machine-frame the side pieces of the horizontal conveyer-frame are continued horizontally outward and thence upward, forming an elevator D', which is practically a continuation of the horizontal conveyer. The upper end d of the elevator D' is pivotally connected with the lower or body section of the conveyer-frame through the medium of a shaft 62, and where the sections of the elevator-frame meet, as illustrated in Fig. 3, they are provided with metal caps 65, properly flattened, and through the flattened surfaces of the caps the shaft 62 is passed.

Sprocket-wheels 63 are located on the shaft 62 within the frame of the elevator, and preferably at the under side of the top portion of the body-section of the elevator a small sprocket-wheel 64 is journaled at each inner side face of the frame. Under this construction it is obvious that the upper end d of the elevator may be raised or lowered, so as to conduct the material to be carried by the elevator either straight upward or at any desired angle to or from the ground.

At the extreme upper end of the pivoted section d of the elevator-frame a shaft 66 is journaled, provided with sprocket-wheels 67. Two endless carrier-chains 68 are passed over the sprocket-wheels 60 on the left-hand shaft 59 of the horizontal conveyer, thence along the top and bottom of a flooring or platform which extends from end to end of the horizontal conveyer-frame, and may be continued, if desired, within the elevator-frame. The endless chain belts 68 are passed over sprocket-wheels 61, located at each side of the bend in the elevator-frame, or where said frame connects with the frame of the conveyer, as shown particularly in Figs. 1 and 3. These small sprocket-wheels 61 are guides for the upper stretches of the chain, and rollers 61ᵃ need only be employed as guides for the lower stretches of the conveyer-chains at this point, as shown in Fig. 3.

The endless chain belts 68, after engaging with the wheels 61, are carried upward within the conveyer-frame over the sprocket-wheels on the shaft 62, also over the sprocket-wheels 64, as shown in Figs. 10 and 11, and around the sprocket-wheel 67 on the upper shaft 66 of the elevator-frame. The endless chains 68 are connected by slats or bars 69, and each slat or bar is provided with a series of pins 70, projecting from its outer side face. A bracket 71 is attached to each side beam of the elevator D', as shown in Figs. 3 and 10, which brackets extend above the elevator-frame and form bearings for the ends of a bail 72, or a U-shaped rod or its equivalent, the free end of which rod or bail is adapted to enter any one of a number of recesses 73 made in the under edge of the pivoted section of the elevator, as is especially shown in Fig. 10. In this manner the delivery-section of the elevator may be supported in any position that occasion may demand.

At the left-hand side of the main frame of the machine near the upper end of the inclined or rear conveyer C, or upon the left-hand box of the conveyer, a vertical bearing 74 is formed, in which a shaft 75 is journaled. The said shaft is provided at its left-hand end with a pinion 76 and a beveled gear 77. The pinion 76 meshes with the pinion 78 on the drive-shaft 44 of the rear or inclined conveyer, as shown in Fig. 3. The beveled gear 77 meshes with the gear 79, secured upon a shaft 80, placed parallel with the main frame of the machine and journaled in bearings 81, projected outward from the left-hand side of the main frame, as shown in Fig. 1. The shaft 80 likewise carries a sprocket-wheel 82, which is connected by a chain belt 83 with a sprocket-wheel 84, located on the outer end of the driving elevator-shaft 62.

It will be observed that all the conveyers and the elevator are driven from the driving-gears 31 of the rear supporting-wheels of the machine, and that the intermediate gearing is exceedingly simple, but little intermediate gearing being required.

Having thus described my invention, I claim as new and desire to secure by Letters Patent—

1. A rake-head for hay rakes and loaders, horse hay-rakes and similar machines, consisting of end pieces, front and rear plates connecting the end pieces, truss-braces secured to the front and rear plates, and sockets located between the truss-braces and rake-teeth, the upper ends whereof are held in said sockets, the portions of the teeth contained in the head below the sockets being in engagement with the truss-braces, as and for the purpose specified.

2. A rake-head consisting of end pieces, front and rear bars or plates connecting the end pieces, braces extending from and attached to the front and rear plates or bars, sockets located between said braces, having downwardly-extending members, a space being formed between the body of the sockets and their downwardly-extending members and the braces for the reception of the shanks of the rake-teeth, as and for the purpose specified.

3. A rake-head consisting of end pieces, front and rear bars connecting the end pieces, braces connecting the front and rear bars, sockets located between said braces, having downward extensions, spaces being formed between the ends of the sockets and their extensions and the opposing surfaces of the braces, hangers secured to one of the connecting-bars for the end pieces of the head, guide-rods attached to said hangers, and springs located on the guide-rods, said guide-rods being located substantially in alinement with the spaces between the sockets and the braces, as and for the purpose specified.

4. A rake-head consisting of end pieces provided with spindles at their lower ends, front and rear bars connecting the end pieces, braces attached to the front and the rear bars, sockets formed between the braces, hangers attached to the front bar, extending below the same, rake-teeth secured in said sockets and engaging with the braces, guides attached to the hangers through which the rake-teeth pass, and tension devices carried by the guides, acting upon the rake-teeth, substantially as described.

5. A rake-head consisting of end pieces provided with spindles at their lower faces, front and rear bars connecting the end pieces, braces attached to the front and the rear bars, sockets formed between the braces, hangers attached to the front bar, extending below the same, rake-teeth secured in said sockets and engaging with the braces, guides attached to the hangers through which the rake-teeth pass, and tension devices carried by the guides, acting upon the rake-teeth, and a bar connecting the extreme rear portion of the end pieces of the head through which the guide-bars pass, said rearmost bar being engaged by the springs carried by the guide-bars, as and for the purpose specified.

6. In a hay rake and loader, the combination, with a frame consisting of side heads or boxes provided with interior angular endless channels, tracks being located within the said channels having their forward ends downwardly curved, and a flooring connecting said side heads or boxes, each side head or box having an outer channel communicating with the inner channel, of endless belts, cross-bars entering the exterior channels in the boxes, levers secured upon the ends of the cross-bars, friction-rollers carried by the levers, adapted to travel in the aforesaid tracks, and picker-fingers secured to the said cross-bars, substantially as shown and described.

7. In a hay rake and loader, or similar machine, the combination, with a conveyer-frame consisting of side heads or boxes, each being provided with an interior angular groove forming a track, the forward end of the track being downwardly curved and the forward wall of the groove being recessed, each head or box being provided with an exterior channel communicating with the interior one, of endless carriers, cross-bars journaled upon the carriers, entering the exterior grooves in the heads or boxes, trip-levers secured upon the ends of the cross-bars, each lever having a head at one side of its center and a friction-roller at the opposite side of its center, the latter traveling on the track and the former being adapted for engagement with the recesses in the forward end wall of the box-grooves, and picker-fingers carried by said cross-bars, as and for the purpose specified.

SAMUEL M. JENKS.

Witnesses:
J. I. LEONARD,
J. McG. EMERSON.